United States Patent [19]

Scholz

[11] Patent Number: 4,789,716

[45] Date of Patent: Dec. 6, 1988

[54] METHOD OF MANUFACTURING POLYMALEIC ANHYDRIDE POWDERS

[75] Inventor: Bernhard-Peter Scholz, Oer-Erkenschwick, Fed. Rep. of Germany

[73] Assignee: Hüls Aktiengesellschaft, Marl, Fed. Rep. of Germany

[21] Appl. No.: 74,023

[22] Filed: Jul. 16, 1987

[30] Foreign Application Priority Data

Oct. 14, 1986 [DE] Fed. Rep. of Germany ....... 3634956

[51] Int. Cl.$^4$ ............................ C08F 2/00; C08F 34/02
[52] U.S. Cl. ..................................... 526/201; 526/271
[58] Field of Search ................................ 526/271, 201

[56] References Cited

U.S. PATENT DOCUMENTS

| | | | |
|---|---|---|---|
| 3,385,834 | 5/1968 | Merijan | 526/271 |
| 3,457,240 | 7/1969 | Heuck et al. | 526/271 |
| 3,513,136 | 5/1970 | Blumbergs et al. | 526/271 |
| 3,708,436 | 1/1973 | Thompson et al. | 252/117 |
| 3,887,528 | 6/1975 | Lottes et al. | 526/201 |
| 4,250,289 | 2/1981 | Denzinger et al. | 526/201 |
| 4,260,724 | 4/1981 | Perner et al. | 526/229 |
| 4,698,395 | 10/1987 | Inoue et al. | 528/489 |

FOREIGN PATENT DOCUMENTS

| | | | |
|---|---|---|---|
| 1162083 | 1/1964 | Fed. Rep. of Germany | 526/271 |
| 38-11282 | 5/1963 | Japan | 526/271 |
| 60-231710 | 11/1985 | Japan | 526/201 |
| 62-34901 | 2/1987 | Japan | 526/271 |
| 987751 | 3/1965 | United Kingdom | 526/201 |
| 1193146 | 5/1970 | United Kingdom | . |

*Primary Examiner*—Joseph L. Schofer
*Assistant Examiner*—N. Sarofin
*Attorney, Agent, or Firm*—Oblon, Fisher, Spivak, McClelland & Maier

[57] ABSTRACT

A method of manufacturing pulverulent polymaleic anhydrides in which maleic anhydride is polymerized in an organic solvent in the presence of a dispersant. Polymerization results in high yields of polymaleic anhydride, as a colorless or faintly colored powder.

14 Claims, No Drawings

METHOD OF MANUFACTURING POLYMALEIC ANHYDRIDE POWDERS

BACKGROUND OF THE INVENTION

1. Field of the Invention

The invention relates to a method of manufacturing pulverulent polymaleic anhydride (poly-MA) by radical polymerization of maleic anhydride (MA) in an organic solvent.

2. Discussion of the Background

The copolymerization of MA with olefins has long been known. However, the first reports of polymerization of MA alone appeared in 1961 (See 1962, Makromol. Chemie, 53:33), with UV irradiation or with initiation by means of organic peroxides.

In Eur. Pat. No. 0 009 171, polymerization of MA in acetic anhydride with hydrogen peroxide was proposed. Because the anhydride groups are hydrolyzed at the same time, this method produces polymaleic acid directly. If the acetic anhydride is replaced by toluene, only very dark polymers are obtained.

U.S. Pat. No. 3,708,436 discloses polymerization of MA in high-percent solutions in toluene, with the aid of benzoyl peroxide. In this method, poly-MA is obtained as a solid mass. Yields are about 35–60%.

According to Brit. Pat. No. 1,193,146, MA is polymerized in 15–50% solutions in toluene with the aid of benzoyl peroxide. Here the polymer is obtained as a black tar. The product can be crystallized by reprecipitation.

In U.S. Pat. No. 3,919,258, MA is polymerized in xylene at 120°–145° C., using di-tert-butyl peroxide in the amount of 15–40% (based on the MA). The poly-MA is isolated as a clear brown liquid, from which a cream-colored powder can be obtained by reprecipitation.

According to Ger. Pat. No. 1,162,083, MA can be polymerized in dilute solutions in inert solvents, with benzene being the preferred solvent. The products are obtained as finely dispersed powders. They are filtered and are purified by ether extraction. The radical-forming agent primarily used in the polymerization is dicyclohexyl percarbonate. Dibenzoyl peroxide is less reactive in the system described, and even with activation by cobalt oleate still gives relatively low yields of poly-MA.

The known methods of polymerization thus have the following characteristics:

(a) Poly-MA is obtained only as a solid mass or a liquid, when prepared in toluene solution;

(b) Polymerization in xylene requires high initial concentrations, with the poly-MA being obtained initially as a liquid, from which a powder can be produced by reprecipitation;

(c) With polymerization in benzene using low concentrations, poly-MA can be obtained as a powder. However, this powder must be purified by ether extraction.

SUMMARY OF THE INVENTION

Accordingly, one object of the present invention is to provide a method of manufacturing poly-MA having an increased MA conversion in the polymerization of MA in concentrated solutions.

Another object of the invention is to provide a method of manufacturing poly-MA which uses a lower concentration of the radical-forming agent.

Still another object of the invention is to provide a method of manufacturing poly-MA directly as a clear powder without a reprecipitation purification step.

These and other objects of the invention which will become apparent from the following specification have been achieved by the present method of manufacturing pulverulent polymaleic anhydride, which comprises the steps of (i) polymerizing a solution of maleic anhydride in an aromatic organic solvent in the presence of a radical-forming compound and a dispersing agent to produce powdered polymaleic anhydride, and (ii) separating out the powdered polymaleic anhydride.

DETAILED DESCRIPTION OF THE PREFERRED EMBODIMENT

According to the invention, the polymerization is carried out in an aromatic solvent and with a dispersant, and after the polymerization, the pulverulent product is separated out by filtration, decanting, or centrifuging.

Suitable aromatic solvents are benzene, toluene, xylene, and other alkylbenzenes (other than xylene). Alkylbenzenes having $C_{1-4}$ alkyl groups are preferred. The alkylbenzenes may have from 1 to 4 alkyl groups as substituents. Toluene is particularly preferred as the solvent for MA.

The concentration of the MA solution used for the polymerization can be varied over a wide range. Preferably, however, concentrated solutions are used, so as to be economical in terms of solvent amount and apparatus size. Most preferably, 36%–50% solutions are used.

The reaction temperature is generally 85°–120° C.

Preferred dispersants are ethylene-vinyl acetate copolymers. These dispersants are used in concentrations up to 15% (based on the MA); preferred concentrations are in the range 0.3–5%.

The radical-forming compounds may be diisopropyl percarbonate, dicyclohexyl percarbonate, lauryl peroxide, or dibenzoyl peroxide.

The amount of the radical-former added to the MA solution is <20% (based on the MA); the preferred amount is in the range 5–15%.

The radical-former is generally added in dissolved form, continuously or portionwise, during the entire reaction time. After completion of the addition, the polymerization is completed during an additional reaction time. The poly-MA, which has been produced as a powder, is separated out, by centrifuging, decanting, or filtering. Preferably, the polymer is recovered by filtration.

The inventive method enables the polymerization of MA to poly-MA at high conversions, with the use of relatively little radical-former, and without an additional activator. The products occur as powders, and can therefore be separated out in simple fashion. Further, products which are colorless or a faint beige or rose color can be obtained, which can be used without reprecipitation or extraction.

The poly-MA prepared by the inventive method is suitable as an anti-scalant or a detergent enhancer (cobuilder).

Other features of the invention will become apparent during the course of the following descriptions of exemplary embodiments which are given for illustration of the invention and are not intended to be limiting thereof.

EXAMPLES

Example 1

The following were charged into a 1-liter flask: 187.5 g MA, 375 ml toluene, and 1.88 g Levapren® 500 ethylene-vinyl acetate copolymer (supplied by Bayer AG, D-5090 Leverkusen, W. Germany). The mixture was heated to 90° C. under nitrogen. Then 13.5 g (3 mole %) anhydrous dibenzoyl peroxide in 187.5 ml toluene was added dropwise over 5 hr. The mixture was stirred another 10 hr. The initial MA solution in toluene was clear, but after about 10% of the peroxide amount had been added the solution was turbid. The product mixture was a faint rose colored, milky dispersion. At the end of the 10-hr additional reaction time, the pulverulent poly-MA was filtered out.

The conversion was determined in a parallel experiment, as follows:

At the end of the additional reaction time, 350 ml water was added. After stirring 1 hr at 90° C., the mixture was cooled to room temperature and the phases this maleic acid content. MA conversion: 86%.

Comparison Example A

The procedure was as per Example 1, except that no Levapren® 500 was added. During the addition of the dibenzoyl peroxide, a second continuous phase formed, which settled out as a brown oil on the bottom of the reaction vessel. The toluene phase was decanted off.

From polarographic determination of the maleic acid, an MA-conversion of 65% was calculated.

Examples 2 and 3, and Comparison Examples B and C

In this set of tests, carried out in a 12-liter "V4A" double jacket stirred reaction vessel with a 250 rpm impeller stirrer, the amounts listed in Table 1 were used.

The MA, toluene, and in some cases Levapren® 500, were charged into the reaction vessel, and the mixture was heated to 95° C. under nitrogen. Then the anhydrous dibenzoyl peroxide in toluene was added portionwise, over a period of 8 hr. The mixture was stirred an additional 10 hr. In Examples 2 and 3, the pulverulent poly-MA obtained was then separated out by filtration.

TABLE 1

| | Materials Charged | | | Materials Added Portionwise | | Maleic Acid, mole % based on | |
|---------|-----------|---------|--------------|------------------|---------|--------------------|---------------|
| Example | MA (g) | Toluene (ml) | Lavapren® 500 (g) | Dibenzoyl Peroxide (g) | Toluene (ml) | the total MA charged (Mole %) | MA Conversion (%) |
| 2 | 2,000 | 4,000 | 30 | 144.2 (3 Mole %) | 1,500 | 3.9 | 96.1 |
| 3 | 2,000 | 3,000 | 30 | 240.4 (5 Mole %) | 2,500 | 1.9 | 98.1 |
| B | 2,000 | 4,000 | 0 | 144.2 (3 Mole %) | 1,500 | 11.2 | 88.8 |
| C | 2,000 | 3,000 | 0 | 240.4 (5 Mole %) | 2,500 | 8.9 | 91.1 |

In the Comparison Examples B and C, the poly-MA was obtained as a brown solid mass.

In a series of parallel experiments, 3,000 ml water was added to each product mixture at the end of the 10-hr additional stirring time, followed by 2 hr further stirring at 90° C., and then cooling to room temperature. The organic and aqueous phases at room temperature were separated. The maleic acid content in the aqueous phase was determined polarographically, and the MA conversion was calculated.

It is seen clearly from Table 1 that the addition of a dispersant substantially improves the overall conversion, for a given peroxide concentration.

Example 4

In a 40-liter "V4A" double jacket stirred reaction vessel, the following materials were charged: 6,600 g MA, 12,000 ml toluene, and 99 g Levapren® 500. The reactor was purged with nitrogen and was heated to 95° C. Over a period of 8 hr, 476 g anhydrous dibenzoyl peroxide in 6,650 ml toluene was continually added portionwise. The mixture was stirred an additional 12 hr, and was then cooled to room temperature.

The product was transferred to a tin plate container. A pale rose, flocculent product slowly precipitated from the brownish toluene solution. The product was filtered out with a Buechner funnel, and was then dried in a drying furnace at 40° C. and 200 mbar, under a slight stream of nitrogen. Yield: 6,220 g poly-MA. Conversion: 93.5%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing pulverulent polymaleic acid anhydride, comprising the steps of:
   (i) polymerizing a solution of maleic anhydride in an aromatic organic solvent in the presence of a radical-forming compound and a dispersing agent to produce powdered polymaleic acid anhydride; and
   (ii) separating out said powdered polymaleic acid anhydride.

2. The method of claim 1, wherein said radical-forming compound is selected from the group consisting of diisopropyl percarbonate, dicyclohexyl percarbonate, lauryl peroxide and dibenzoyl peroxide.

3. The method of claim 1, wherein said radical-forming compound is dibenzoyl peroxide.

4. The method of claim 1, wherein said solvent is selected from the group consisting of benzene and $C_{1-4}$ mono, di, tri and tetra-substituted alkylbenzenes.

5. The method of claim 1, wherein said solvent is selected from the group consisting of benzene, toluene and xylene.

6. The method of claim 1, wherein said solvent is toluene.

7. The method of claim 1, wherein said polymerizing step is conducted at a temperature of about 85°–120° C.

8. The method of claim 1, wherein said dispersing agent is present in an amount of 15 wt. % or less based on the weight of maleic anhydride.

9. The method of claim 1, wherein said dispersing agent is present in an amount of about 0.3–5 wt. % based on the weight of maleic anhydride.

10. The method of claim 1, wherein said dispersing agent is an ethylene-vinyl acetate copolymer.

11. The method of claim 1, wherein said solution is about 36–60% maleic anhydride.

12. The method of claim 1, wherein said separating step comprises filtering, decanting or centrifuging.

13. The method of claim 1, wherein said radical-forming compound is present in an amount less than 20 wt. % based on the weight of maleic anhydride.

14. The method of claim 13, wherein said radical-forming compound is present in an amount of about 5–15 wt. %.

* * * * *